(12) United States Patent
Kikuchi et al.

(10) Patent No.: US 10,046,924 B2
(45) Date of Patent: Aug. 14, 2018

(54) CORE CONVEYING DEVICE AND CORE CONVEYING METHOD

(71) Applicant: TOYOTA JIDOSHA KABUSHIKI KAISHA, Toyota-shi, Aichi-ken (JP)

(72) Inventors: Makoto Kikuchi, Nisshin (JP); Tsubasa Ito, Nagoya (JP); Yoshitaka Tanaka, Miyoshi (JP); Tadashi Nakahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/837,351

(22) Filed: Dec. 11, 2017

(65) Prior Publication Data

US 2018/0170688 A1 Jun. 21, 2018

(30) Foreign Application Priority Data

Dec. 21, 2016 (JP) .................................. 2016-247723

(51) Int. Cl.
| | |
|---|---|
| *B65G 47/86* | (2006.01) |
| *B65G 47/90* | (2006.01) |
| *B25J 15/00* | (2006.01) |
| *B66C 1/46* | (2006.01) |
| *B22C 23/00* | (2006.01) |

(52) U.S. Cl.
CPC .......... *B65G 47/90* (2013.01); *B25J 15/0023* (2013.01); *B22C 23/00* (2013.01); *B66C 1/46* (2013.01)

(58) Field of Classification Search
CPC .... B65G 47/842; B23Q 7/164; B23Q 1/5406; B22C 23/00; B22C 9/108; B66C 1/46

USPC ............................................ 198/468.2, 468.6
See application file for complete search history.

(56) References Cited

U.S. PATENT DOCUMENTS

| | | | | |
|---|---|---|---|---|
| 3,134,620 | A | * 5/1964 | Blaisdell | B66C 1/46 294/100 |
| 3,945,486 | A | * 3/1976 | Cooper | B65B 21/12 118/503 |
| 5,425,441 | A | 6/1995 | Landua et al. | |
| 5,991,571 | A | * 11/1999 | Yamada | G03G 15/0928 29/895.22 |
| 7,891,076 | B2 | * 2/2011 | Schmitt | B05C 13/025 242/571.1 |

(Continued)

FOREIGN PATENT DOCUMENTS

| | | |
|---|---|---|
| JP | H05-509071 A | 12/1993 |
| JP | 2008-023590 A | 2/2008 |
| JP | 2010-012581 A | 1/2010 |

*Primary Examiner* — James R Bidwell
(74) *Attorney, Agent, or Firm* — Oliff PLC

(57) ABSTRACT

A core conveying device includes a plurality of holding devices, a support section, a moving device, and a mounting table. The support section has a hole formed at a position corresponding to a positioning pin and is connected so as to slide in a horizontal direction with respect to the moving device. A size of a lower end opening of the hole is larger than a size of an upper end of the positioning pin. The support section is configured such that, when the support section is moved downward so as to grip the core, as the positioning pin abuts against an inner surface of the hole and the support section slides in the horizontal direction with respect to the moving device, a position of the support section in the horizontal direction with respect to the core is determined.

7 Claims, 22 Drawing Sheets

(56) References Cited

U.S. PATENT DOCUMENTS

2018/0104782 A1\* 4/2018 Tanaka .................. B23Q 7/165
2018/0105401 A1\* 4/2018 Tanaka .................... B22C 23/00

\* cited by examiner

CORE CONVEYING DEVICE AND CORE CONVEYING METHOD

INCORPORATION BY REFERENCE

The disclosure of Japanese Patent Application No. 2016-247723 filed on Dec. 21, 2016 including the specification, drawings and abstract is incorporated herein by reference in its entirety.

BACKGROUND

1. Technical Field

The present disclosure relates to a core conveying device and a core conveying method.

2. Description of Related Art

A core for casting is a mold used to form a hollow part in a casting to be produced. In the related art, the core is manually fitted in the mold. However, as the accuracy of the casting becomes higher, it is becoming more crucial to dispose the core in the mold with high accuracy. For this reason, a technique for disposing the core in the mold with high accuracy is becoming crucial.

Japanese Unexamined Patent Application Publication (Translation of PCT Application) No. 05-509071 (JP 05-509071 A) discloses a technique regarding a conveying device for conveying a core for casting.

SUMMARY

As one of the methods of gripping a core, there is a method of gripping the core using a plurality of holding devices including expandable and contractable gripping parts at tip parts thereof. In the above method, the core is gripped by expanding the gripping parts to make the gripping parts abut against the core.

In a case where the core is gripped using the holding devices including the gripping parts, there is a need for disposing the gripping part at a grip position of the core before the gripping parts are expanded. However, when the gripping parts are disposed at the grip position of the core, the relative positions between the core and the gripping parts may deviate from each other. When the positions of the gripping parts deviate from their original positions in this way, the core may deviate from a predetermined position when the core is conveyed and fitted in the mold.

The present disclosure provides a core conveying device and a core conveying method capable of accurately conveying a core.

A first aspect of the present disclosure relates to a core conveying device. The core conveying device includes a plurality of holding devices, a support section that supports the holding devices, a moving device that is connected to the support section and is configured to move the support section; and a mounting table that includes a positioning pin that extends in an upward direction and is configured to accommodate the core. Each of the holding devices includes a gripping part configured to be expanded and contracted by a fluid, and the gripping part is configured to be expanded so as to grip the core. The support section has a hole formed at a position corresponding to the positioning pin and is connected so as to slide in a horizontal direction with respect to the moving device. A size of a lower end opening of the hole is larger than a size of an upper end of the positioning pin. The support section is configured such that, when the support section is moved downward so as to grip the core, as the positioning pin abuts against an inner surface of the hole and the support section slides in the horizontal direction with respect to the moving device, a position of the support section in the horizontal direction with respect to the core is determined.

In the core conveying device according to the first aspect of the present disclosure, a shape of the positioning pin may be a cone shape that tapers in an upward direction, and the inner surface of the hole may be a tapered shape of which a diameter becomes gradually smaller in the upward direction.

The core conveying device according to the first aspect of the present disclosure may further include a fixing device that fixes the support section to the moving device.

A second aspect of the present disclosure relates to a core conveying method for a core conveying device. The core conveying device includes a plurality of holding devices, a support section, a moving device, and a mounting table. Each of the holding devices includes a gripping part configured to be expanded and contracted by a fluid. The support section supports the holding devices. The moving device is connected to the support section and is configured to move the support section. The mounting table is configured to accommodate the core. The mounting table includes a positioning pin that extends in an upward direction. The support section has a hole formed at a position corresponding to the positioning pin. The support section is connected so as to slide in a horizontal direction with respect to the moving device. A size of a lower end opening of the hole is larger than a size of an upper end of the positioning pin. The core conveying method includes moving the support section downward to make the positioning pin abut against an inner surface of the hole when the core is gripped by the gripping part; and sliding the support section in the horizontal direction with respect to the moving device and determining a position of the support section in the horizontal direction with respect to the core when the positioning pin abuts against the inner surface of the hole.

The core conveying method according to the second aspect of the present disclosure may further include expanding the gripping parts to grip the core after the position of the support section in the horizontal direction with respect to the core is determined, and fixing the support section to the moving device using a fixing device that fixes the support section to the moving device after the core is gripped.

The core conveying method according to the second aspect of the present disclosure may further include releasing a state where the support section is fixed to the moving device and making a mold positioning pin abut against the inner surface of the hole, when the gripped core is fitted in a mold, and sliding the support section in the horizontal direction with respect to the moving device and determining a position of the support section in the horizontal direction with respect to the mold, when the mold positioning pin abuts against the inner surface of the hole. The mold positioning pin may be provided on the mold and extend in an upward direction from the mold.

In the core conveying method according to the second aspect of the present disclosure, a shape of the positioning pin or the mold positioning pin may be a cone shape that tapers in an upward direction, and the inner surface of the hole may be a tapered shape of which a diameter becomes gradually smaller in the upward direction.

In the core conveying device and the core conveying method according to the first aspect and the second aspect of the present disclosure, the support section of the core conveying device slides in the horizontal direction with respect to the moving device. Therefore, when the support section is moved downward so as to grip the core, as the positioning pin provided on the mounting table abuts against the inner surface of the hole of the support section and the support section slides in the horizontal direction with respect to the moving device, the position of the support section in the horizontal direction with respect to the core is determined. That is, when the gripping part is disposed at a grip position of the core, the support section is moved by the moving device to dispose the gripping part at the grip position of the core. However, in this case, there is a case where the relative positions between the core and the gripping part may deviate from each other. In the present disclosure, the support section is configured to slide in the horizontal direction with respect to the moving device, and as the positioning pin provided on the mounting table abuts against the inner surface of the hole of the support section and the support section slides in the horizontal direction with respect to the moving device, the position of the support section in the horizontal direction with respect to the core is determined. Therefore, since the gripping part can be accurately disposed at the grip position of the core, the core can be accurately conveyed.

According to the aspect of the present disclosure, the core conveying device and the core conveying method capable of accurately conveying a core can be provided.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiment 1

Figure 1:
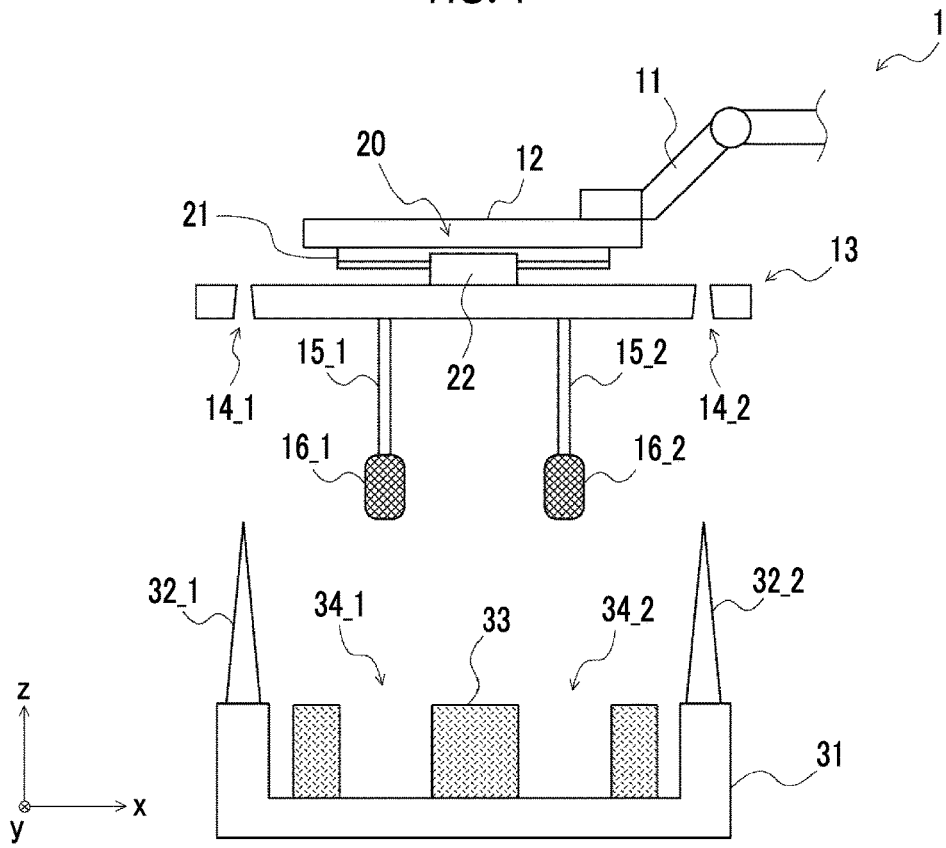
FIG. 1 is a view illustrating a core conveying device according to Embodiment 1.

Hereinafter, embodiments of the present disclosure will be described with reference to the drawings. FIG. 1 is a view illustrating a core conveying device according to Embodiment 1. As illustrated in FIG. 1, a core conveying device 1 includes a robot arm 11, a movable unit (moving device) 12, a support section 13, holding devices 15_1, 15_2, and a mounting table 31.

The robot arm 11 is configured to be capable of moving the movable unit 12 in x, y, and z axial directions. For example, the robot arm 11 moves the movable unit 12 in a state where an upper surface of the movable unit 12 maintains a parallel state with respect to a horizontal plane (xy plane).

The movable unit 12 and the support section 13 are coupled together via a sliding mechanism 20. That is, the support section 13 is configured to be capable of sliding in a horizontal direction, i.e., in an x-axial direction with respect to the movable unit 12.

Figure 2:
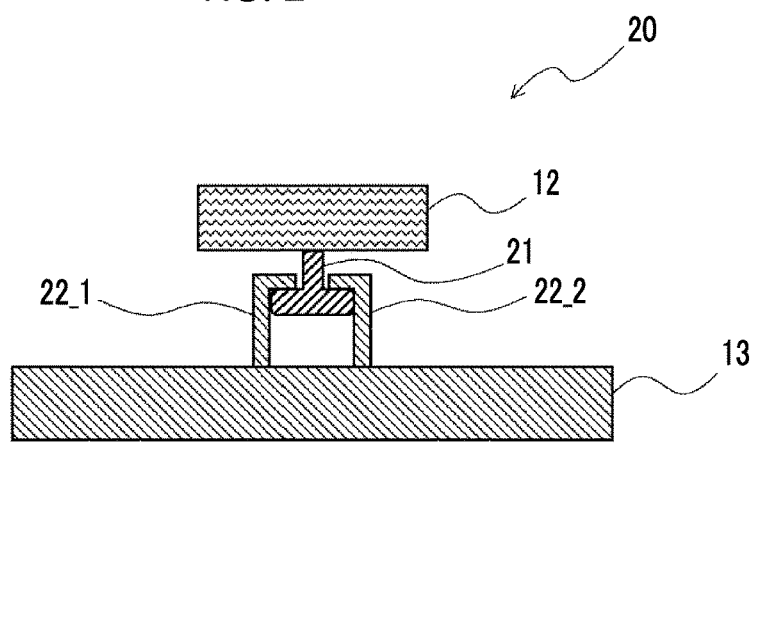
FIG. 2 is a sectional view for describing a sliding mechanism provided in the core conveying device according to Embodiment 1.

FIG. 2 is a sectional view for describing the details of the sliding mechanism 20. The sectional view illustrated in FIG. 2 illustrates a section obtained by cutting the sliding mechanism 20 along a yz plane. As illustrated in FIG. 2, a rail 21 is formed on a lower surface of the movable unit 12. Additionally, sliding parts 22_1, 22_2 are formed on an upper surface of the support section 13. For example, the movable unit 12, the support section 13, the rail 21, and the sliding parts 22_1, 22_2 are made using a metallic material.

As illustrated in FIG. 2, the sliding parts 22_1, 22_2 are provided on both sides of the rail 21 and are configured to be capable of sliding in a direction (x-axial direction) in which the rail 21 extends. Therefore, the support section 13 slides in the x-axial direction with respect to the movable unit 12.

As illustrated in FIG. 1, the holding devices 15_1, 15_2 are fixed to a lower surface of the support section 13. Gripping parts 16_1, 16_2 are respectively provided at tips of the holding devices 15_1, 15_2. The gripping parts 16_1, 16_2 are configured to be expandable and contractable using a fluid (in the following, a case where gas is used will be described as an example), such as gas or liquid, for example, and can be made using an elastic member (for example, rubber balloon), such as rubber. Gas (compressed air) is supplied to each of the gripping parts 16_1, 16_2 via a pipe (not illustrated).

As illustrated in FIG. 1, as grip holes 34_1, 34_2 are formed in a core 33, and the gripping parts 16_1, 16_2 of the holding devices 15_1, 15_2 are respectively expanded inside the grip holes 34_1, 34_2 formed in the core 33, and abut against inner walls (side walls) of the grip hole 34_1, 34_2, the holding devices 15_1, 15_2 are fixed to the core 33.

For example, the gripping parts 16_1, 16_2 can be expanded by supplying the compressed air having a predetermined pressure to the gripping parts 16_1, 16_2. The compressed air is supplied to the gripping parts 16_1, 16_2 via pipes (not illustrated) from a compressor or the like (not illustrated). Additionally, in a case where the gripping parts 16_1, 16_2 are expanded to grip the core, the gripping parts 16_1, 16_2 can be contracted by opening air release valves (not illustrated) of pipes connected to the gripping parts 16_1, 16_2. Accordingly, a state where the gripping parts 16_1, 16_2 grip the core can be released.

As illustrated in FIG. 1, holes 14_1, 14_2 are formed on both sides of the support section 13 in the x-axial direction. Additionally, both end parts, in the x-axial direction, of the mounting table 31 that accommodates the core 33 are provided with positioning pins 32_1, 32_2 that extend upward (z-axial direction). Here, the shape of the positioning pins 32_1, 32_2 is a cone shape (for example, a conical shape) that tapers in an upward direction. Additionally, the shape of inner surfaces of the holes 14_1, 14_2 is a tapered shape corresponding to the shape of the positioning pins 32_1, 32_2. In other words, the shape of the inner surfaces of the holes 14_1, 14_2 is a tapered shape of which the diameter becomes gradually smaller in the upward direction.

The holes 14_1, 14_2 of the support section 13 are formed at corresponding positions in a vertical direction (z-axial direction) with respect to the positioning pins 32_1, 32_2 formed on the mounting table 31. Additionally, the size of lower end openings of the holes 14_1, 14_2 is larger than the size of the upper end (tip) of positioning pins 32_1, 32_2. Therefore, when the support section 13 is moved downward, as the positioning pins 32_1, 32_2 abut against the inner surfaces of the holes 14_1, 14_2, and the support section 13 slides in the horizontal direction (x-axial direction) with respect to the movable unit 12, the position of the support section 13 in the horizontal direction (x-axial direction) with respect to the core 33 is determined (refer to FIG. 3C).

In addition, in the present embodiment, since the positioning pins 32_1, 32_2 are formed on the mounting table 31, the position of the support section 13 with respect to the mounting table 31 is actually determined. However, since the core 33 is accurately placed on the mounting table 31, this is substantially synonymous with positioning of the support section 13 with respect to the core 33. Moreover, since the holding devices 15_1, 15_2 (gripping parts 16_1, 16_2) are accurately attached to the support section 13, the positioning of the support section 13 with respect to the mounting table 31 is substantially synonymous with the positioning of the gripping parts 16_1, 16_2 with respect to the core 33. That is, in the present embodiment, the positioning of the support section 13 with respect to the mounting table 31 and the positioning of the support section 13 with respect to the core 33 are synonymous with the positioning of the gripping part 16_1, 16_2 with respect to the core 33.

Next, the operation when the core conveying device according to the present embodiment conveys a core (core conveying method) will be described with reference to FIGS. 3A to 3J. In the following, the operation until the core 33 placed on the mounting table 31 is fitted in a mold 41 using the core conveying device 1 (refer to FIG. 3F to FIG. 3J) will be described.

Figure 3A:
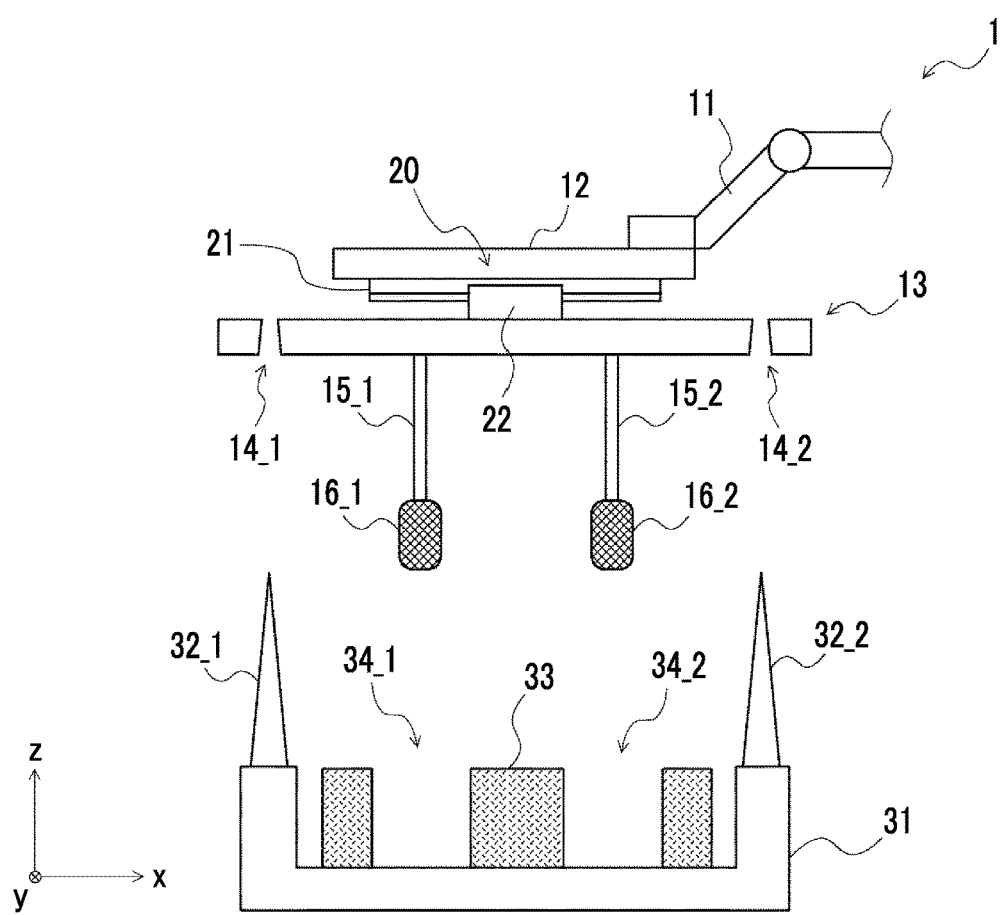
FIG. 3A is a view for describing an operation when the core conveying device according to Embodiment 1 conveys a core.

First, as illustrated in FIG. 3A, the core conveying device 1 is moved to a position where the core 33 is placed. Specifically, the holding devices 15_1, 15_2 (gripping parts 16_1, 16_2) are disposed on the core 33 by adjusting the coordinates of the movable unit 12 on the xy plane using the robot arm 11.

Figure 3B:
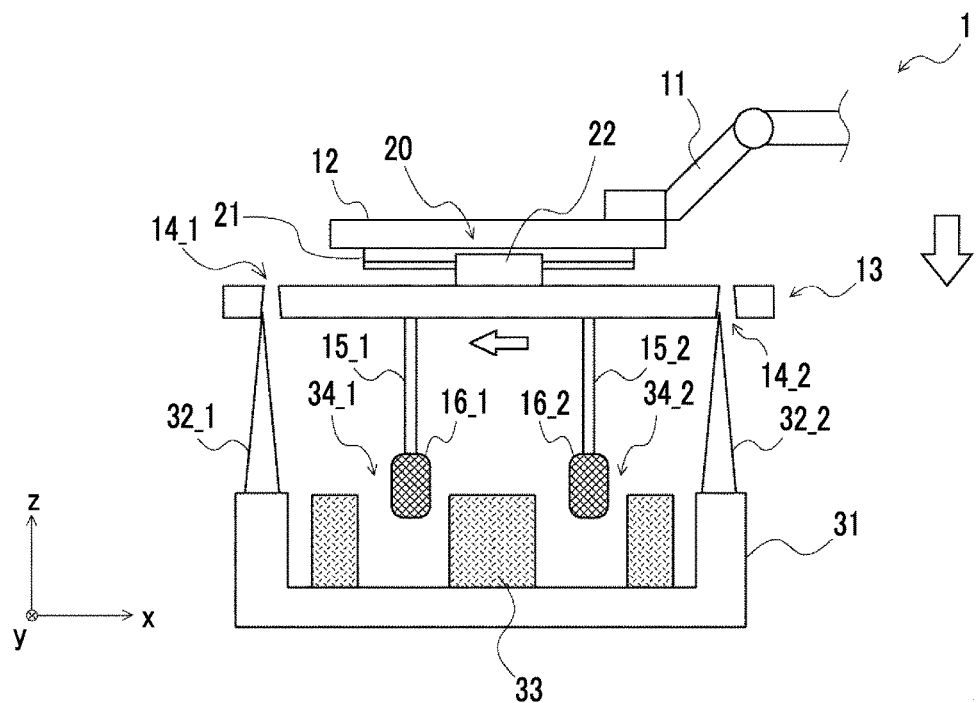
FIG. 3B is a view for describing the operation when the core conveying device according to Embodiment 1 conveys the core.
Figure 3C:
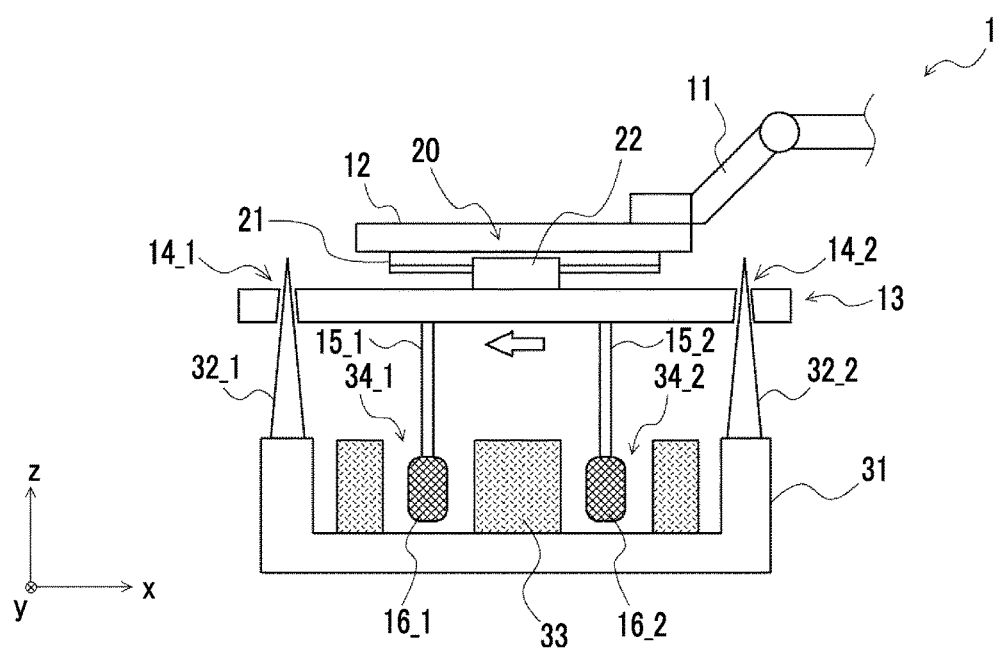
FIG. 3C is a view for describing the operation when the core conveying device according to Embodiment 1 conveys the core.

Next, the movable unit 12 of the core conveying device 1 is moved in a downward direction (z-axis minus direction) using the robot arm 11. Accordingly, the support section 13 moves downward. In this case, as illustrated in FIG. 3B, the tips of the positioning pins 32_1, 32_2 provided on the mounting table 31 abut against the inner surfaces of the holes 14_1, 14_2 of the support section 13. Accordingly, a force in the x-axis minus direction acts on the support section 13.

Then, when the movable unit 12 is further moved in the downward direction using the robot arm 11, the support section 13 further moves downward. Through the operation as described above, as illustrated in FIG. 3C, as the positioning pins 32_1, 32_2 abut against the inner surfaces of the holes 14_1, 14_2, and the support section 13 slides in the horizontal direction (x-axial direction) with respect to the movable unit 12, the position of the support section 13 in the horizontal direction (x-axial direction) with respect to the core 33 is determined. Additionally, the holding devices 15_1, 15_2 move downward, and the gripping parts 16_1, 16_2 of the holding devices 15_1, 15_2 are respectively inserted into the grip holes 34_1, 34_2 formed in the core 33.

Figure 3D:
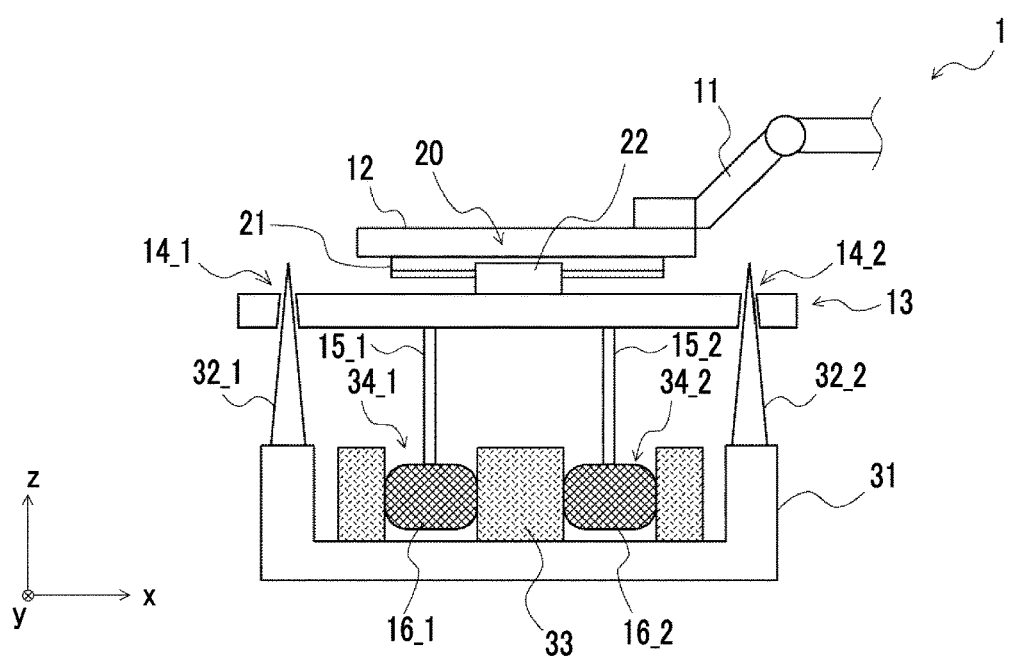
FIG. 3D is a view for describing the operation when the core conveying device according to Embodiment 1 conveys the core.

Next, as illustrated in FIG. 3D, the gripping parts 16_1, 16_2 inserted into the grip holes 34_1, 34_2 formed in the core 33 are expanded. Accordingly, the gripping parts 16_1, 16_2 abut against the inner walls(side walls) of the grip holes 34_1, 34_2 formed in the core 33, and the holding devices 15_1, 15_2 are fixed to the core 33.

Figure 3E:
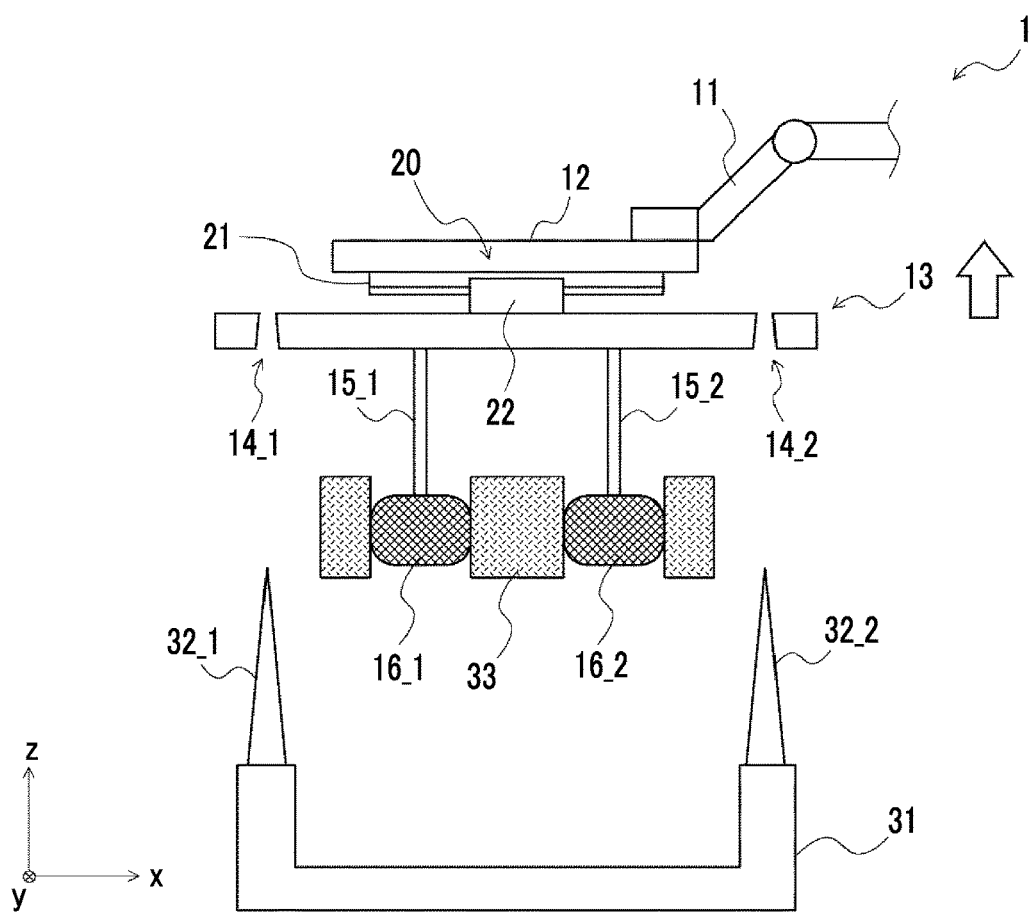
FIG. 3E is a view for describing the operation when the core conveying device according to Embodiment 1 conveys the core.

Next, as illustrated in FIG. 3E, the movable unit 12 of the core conveying device 1 is moved upward (z-axis plus direction) using the robot arm 11. Accordingly, the holding devices 15_1, 15_2 move upward, and the core 33 is lifted. In this case, since the support section 13 is fixed to the movable unit 12, the core 33 can be stably lifted.

Figure 3F:
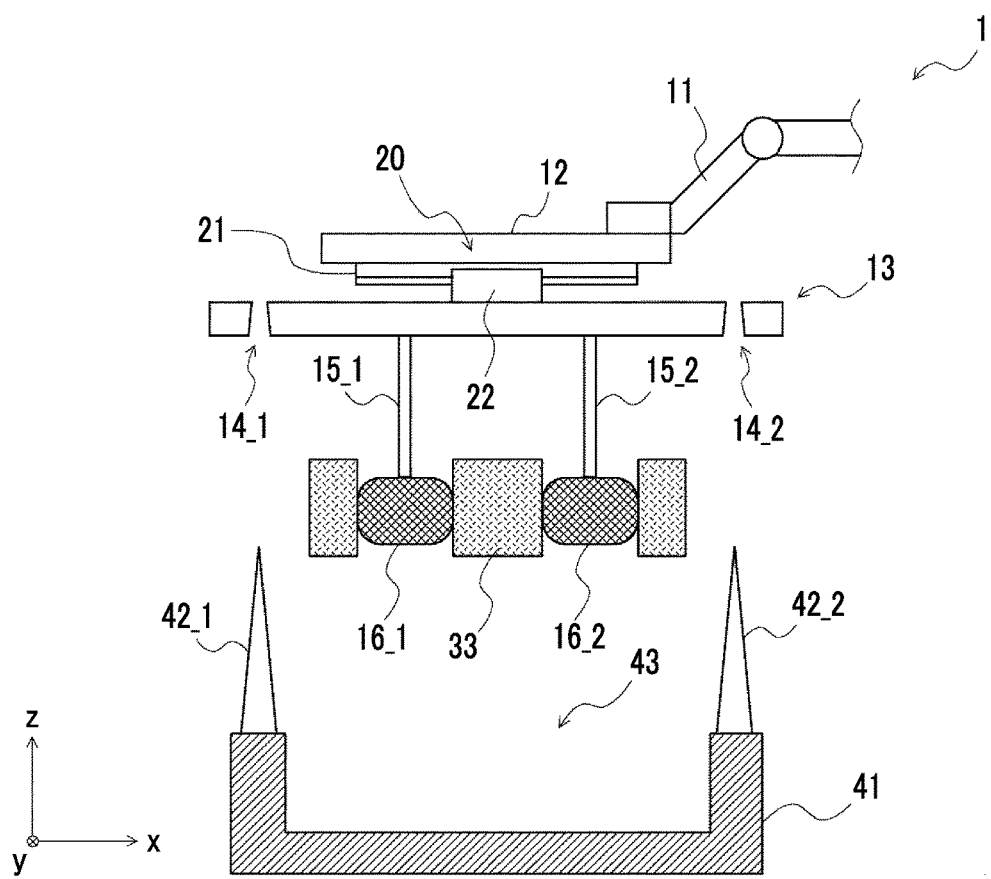
FIG. 3F is a view for describing the operation when the core conveying device according to Embodiment 1 conveys the core.

Thereafter, as illustrated in FIG. 3F, the core conveying device 1 is moved to a position where the mold 41 is placed in a state where the core conveying device 1 grips the core 33. Specifically, the core 33 is disposed in a recess 43 of the mold 41 by adjusting the coordinates of the movable unit 12 on the xy plane using the robot arm 11.

Figure 3G:
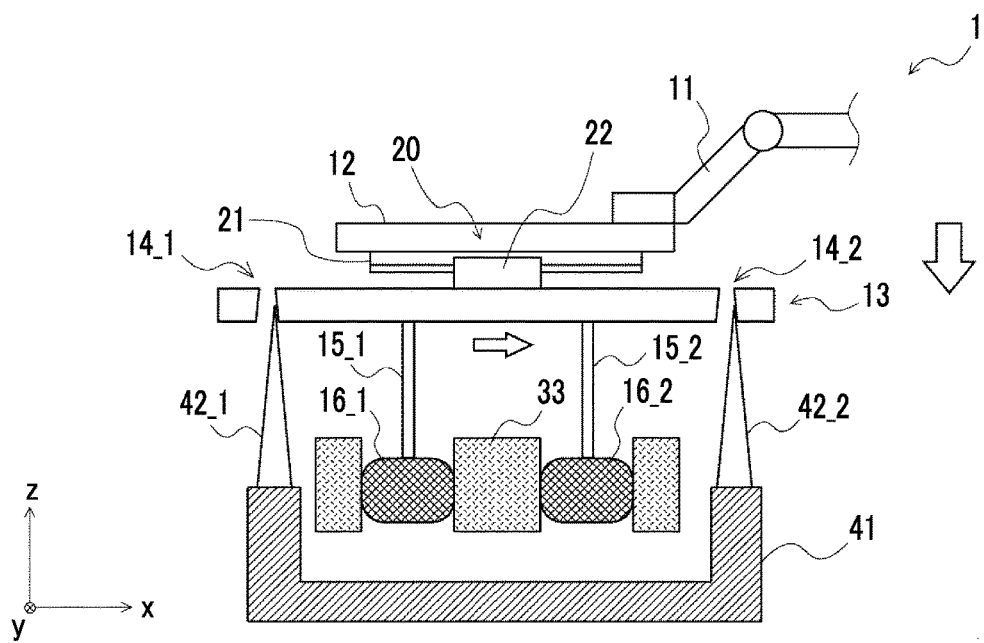
FIG. 3G is a view for describing the operation when the core conveying device according to Embodiment 1 conveys the core.

Next, the movable unit 12 of the core conveying device 1 is moved in the downward direction (z-axis minus direction) using the robot arm 11. Accordingly, the support section 13 moves downward. In this case, as illustrated in FIG. 3G, tips of the mold positioning pins 42_1, 42_2 provided on the mold 41 abut against the inner surfaces of the holes 14_1, 14_2 of the support section 13. Accordingly, a force in the x-axis plus direction acts on the support section 13.

Figure 3H:
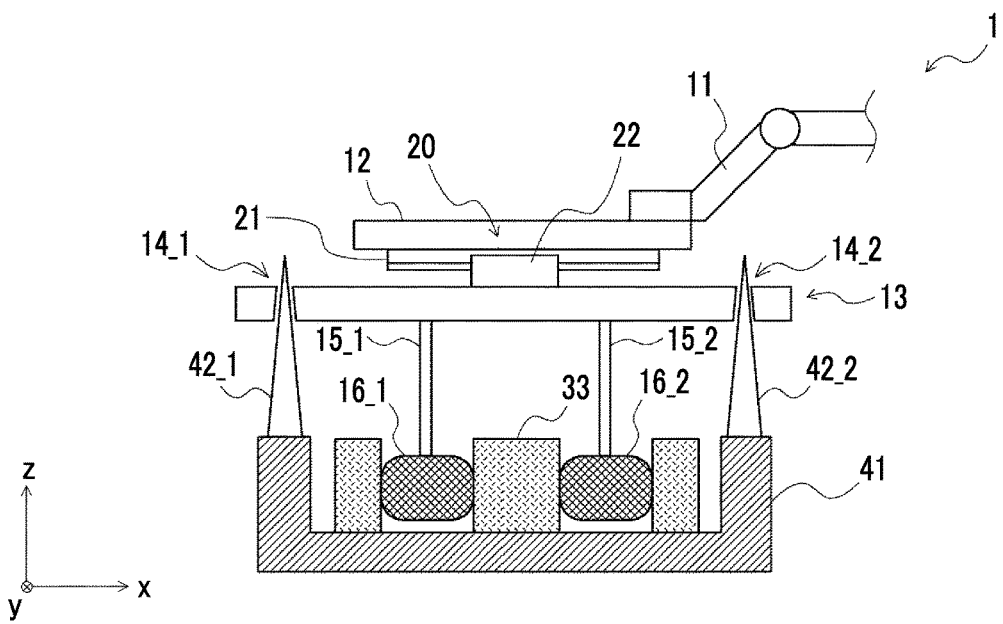
FIG. 3H is a view for describing the operation when the core conveying device according to Embodiment 1 conveys the core.

Then, when the movable unit 12 is further moved in the downward direction using the robot arm 11, the support section 13 further moves downward, and the core 33 is fitted in the mold 41 as illustrated in FIG. 3H. In this case, as the mold positioning pin 42_1, 42_2 formed on the mold 41 abut against the inner surface of the holes 14_1, 14_2 of the support section 13 and the support section 13 slides in the x-axial direction with respect to the movable unit 12, the position of the support section 13 in the x-axial direction with respect to the mold 41 (that is, the position of the core 33 in the x-axial direction with respect to the mold 41) is determined. Therefore, the core 33 can be accurately fitted in the mold 41.

Figure 3I:
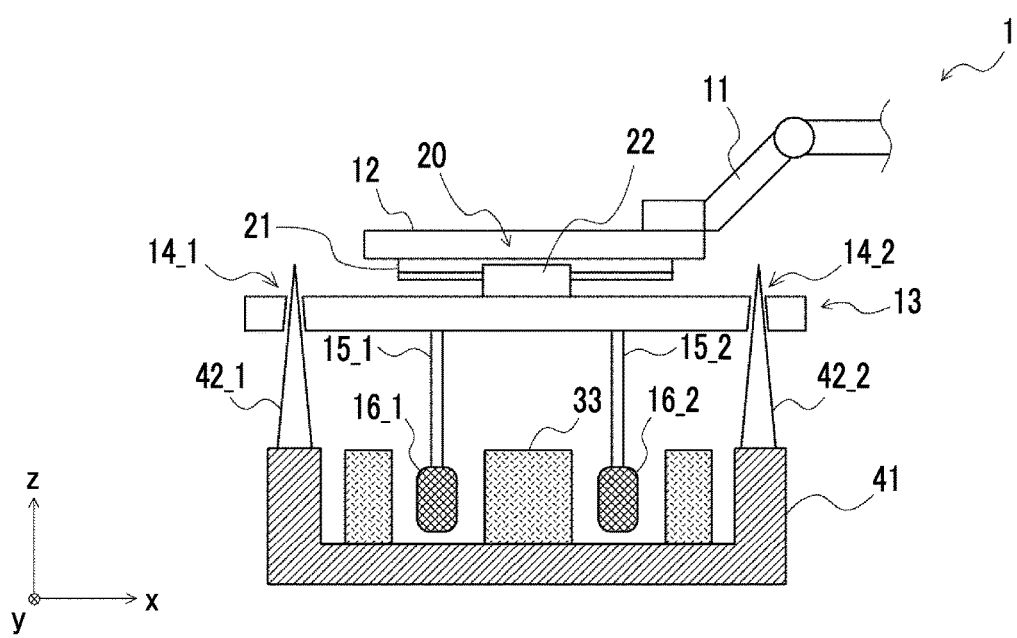
FIG. 3I is a view for describing the operation when the core conveying device according to Embodiment 1 conveys the core.
Figure 3J:
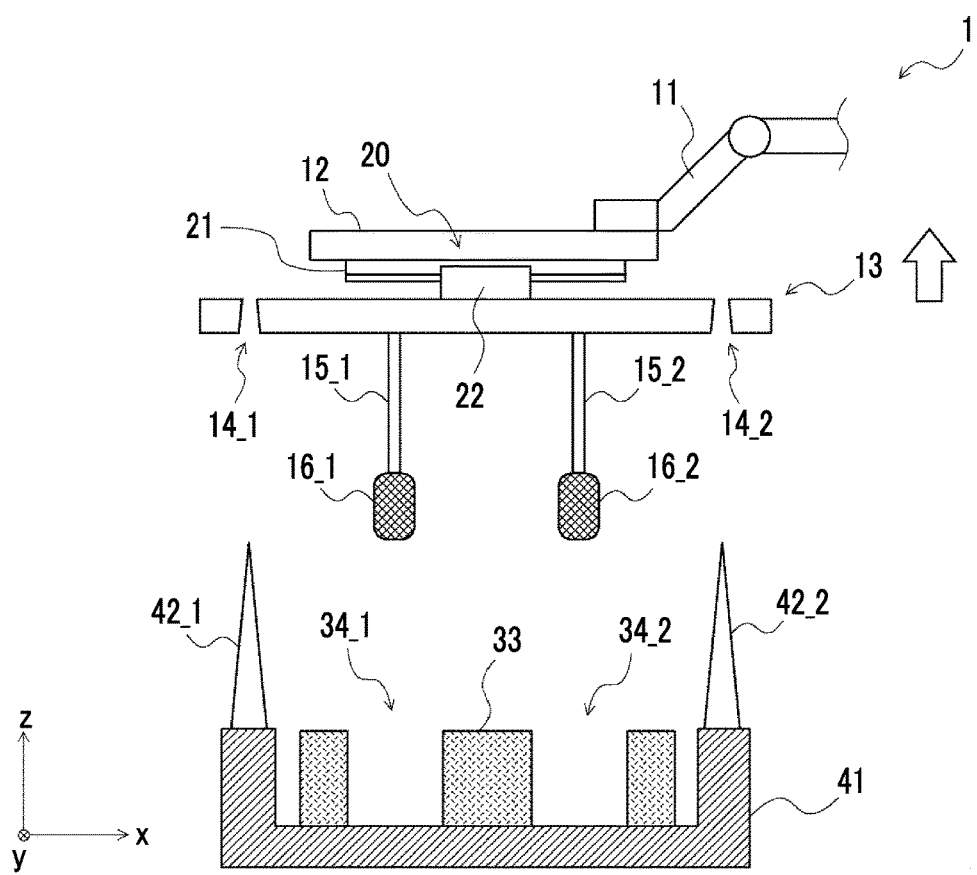
FIG. 3J is a view for describing the operation when the core conveying device according to Embodiment 1 conveys the core.

Thereafter, as illustrated in FIG. 3I, the gripping parts 16_1, 16_2 are contracted. Accordingly, the gripping parts 16_1, 16_2 are brought into a state where the gripping parts do not grip the core 33. Then, as illustrated in FIG. 3J, the movable unit 12 of the core conveying device 1 is moved upward (z-axis plus direction) using the robot arm 11.

Through the operation described above, the core 33 placed on the mounting table 31 using the core conveying device 1 can be accurately fitted in the mold 41.

That is, in the present embodiment, the support section 13 is configured to slide in the horizontal direction with respect to the movable unit 12. Therefore, when the support section 13 is moved downward so as to grip the core 33, the positioning pins 32_1, 32_2 provided on the mounting table 31 abut against the inner surfaces of the holes 14_1, 14_2 of the support section 13 and as the support section 13 slides in the horizontal direction with respect to the movable unit 12, and thereby the position of the support section 13 in the horizontal direction with respect to the core 33 is determined.

That is, when the gripping parts 16_1, 16_2 are disposed at a grip position of the core 33, the support section 13 is moved by the robot arm 11 to dispose the gripping parts 16_1, 16_2 at the grip position of the core 33. However, in this case, there is a case where the relative positions of the core 33 and the gripping parts 16_1, 16_2 may deviate from each other. In the core conveying device 1 according to the present embodiment, the support section 13 is configured to slide in the horizontal direction with respect to the movable unit 12, and as the positioning pins 32_1, 32_2 provided on the mounting table 31 abut against the inner surfaces of the holes 14_1, 14_2 of the support section 13 and the support section 13 slides in the horizontal direction with respect to the movable unit 12, the position of the support section 13 in the horizontal direction with respect to the core 33 is determined. Therefore, even in a case where the position of the support section 13 (the gripping parts 16_1, 16_2) when moving the support section 13 has deviated with respect to the core 33 by the movable unit 12, the gripping parts 16_1, 16_2 can be accurately disposed at the grip position of the core 33 by sliding the support section 13 with respect to the movable unit 12.

Additionally, in a case where the gripped core 33 is fitted in the mold 41 (refer to FIG. 3F to FIG. 3I), similarly, the gripped core 33 can be fitted in the mold 41 accurately by sliding the support section 13 with respect to the movable unit 12.

Additionally, in the core conveying device 1 according to the present embodiment, as illustrated in FIG. 1, the holes 14_1, 14_2 are formed in the support section 13. Therefore, a situation in which sand that has fallen from the core 33 enters the holes 14_1, 14_2 can be suppressed. That is, since the core 33 is formed of sand, when holes are formed in the mounting table 31 or the mold 41 and positioning pins are provided in the support section 13, there is a possibility that the sand that has fallen from the core 33 may enter the holes formed in the mounting table 31 or the mold 41 and the holes may be blocked. In the core conveying device according to the present embodiment, the positioning pins 32_1, 32_2 are provided on the mounting table 31, the mold positioning pins 42_1, 42_2 are provided on the mold 41, and the holes 14_1, 14_2 are formed in the support section 13. Thus, a situation in which sand that has fallen from the core 33 enters the holes 14_1, 14_2 is suppressed.

Figure 4:
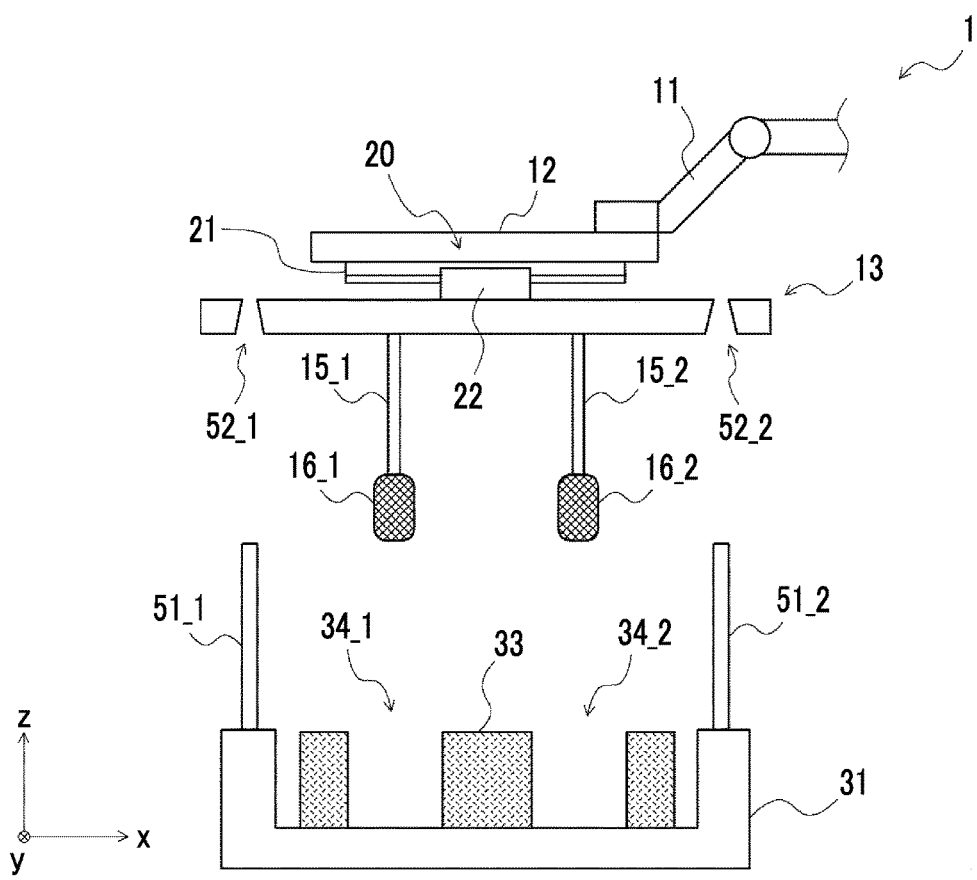
FIG. 4 is a view illustrating another example of holes and positioning pins provided in the core conveying device according to Embodiment 1.
Figure 5:
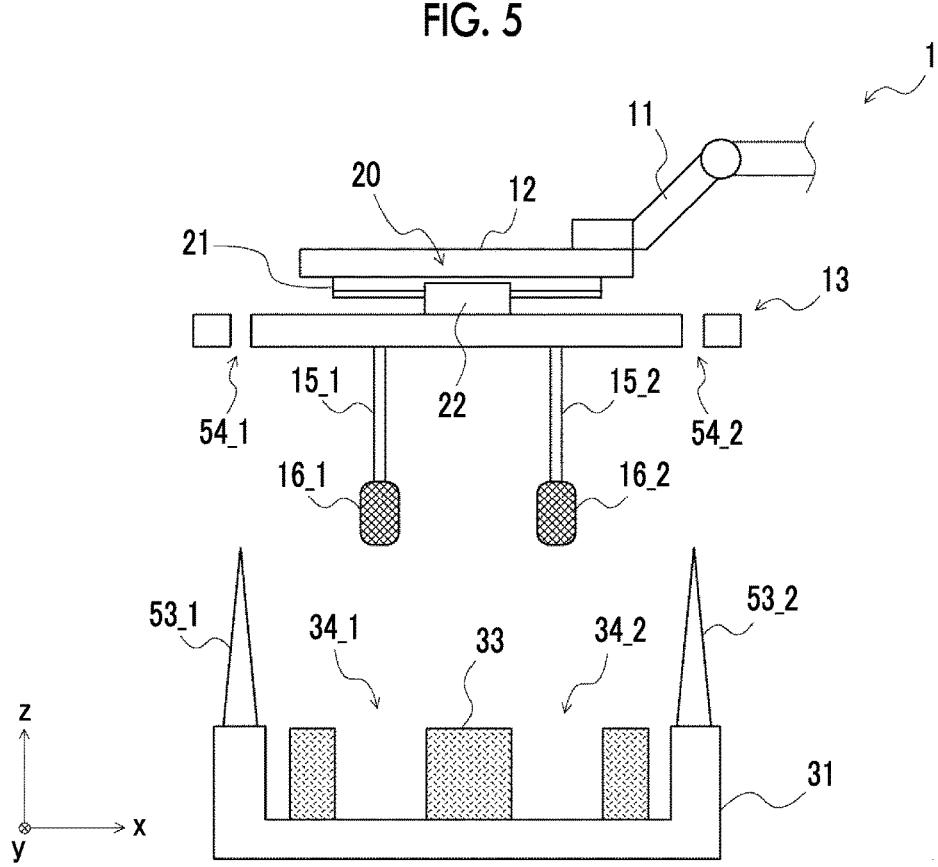
FIG. 5 is a view illustrating still another example of holes and positioning pins provided in the core conveying device according to Embodiment 1.

FIG. 4 and FIG. 5 are views illustrating other examples of holes and positioning pins provided in the core conveying device according to the present embodiment. In the core conveying device according to the present embodiment, as illustrated in FIG. 4, positioning pins 51_1, 51_2 may be configured using columnar members (for example, members, such as polygonal prisms such as rectangular prisms, or cylinders). In this case, the shape of inner surfaces of holes 52_1, 52_2 formed in the support section 13 is a tapered shape of which the diameter becomes gradually smaller in the upward direction. Additionally, the size of lower end openings of the holes 52_1, 52_2 become larger than the size of upper ends of the positioning pins 51_1, 51_2.

By adopting the configuration as described above, when the support section 13 is moved downward, the positioning pins 51_1, 51_2 abut against the inner surfaces of the holes 52_1, 52_2, and the support section 13 slides in the horizontal direction (x-axial direction) with respect to the movable unit 12. Therefore, the position of the support section 13 to a core 33 in the horizontal direction (x-axial direction) can be determined.

Additionally, in the core conveying device according to the present embodiment, as illustrated in FIG. 5, the shape of positioning pins 53_1, 53_2 may be a cone shape (for example, a conical shape) that tapers in the upward direction, and the shape of inner surfaces of holes 54_1, 54_2 formed in the support section 13 may be a columnar shape (for example, a polygonal prismatic shape such as a rectangular prism, a cylindrical shape, or the like). In this case, the size of lower end openings of the holes 54_1, 54_2 may become larger than the size of upper ends (tips) of the positioning pins 53_1, 53_2.

By adopting the configuration as described above, when the support section 13 is moved downward, the positioning pins 53_1, 53_2 abut against the inner surfaces of the holes 54_1, 54_2, and the support section 13 slides in the horizontal direction (x-axial direction) with respect to the movable unit 12. Therefore, the position of the support section 13 to a core 33 in the horizontal direction (x-axial direction) can be determined.

In addition, the mold positioning pins can also be configured like the positioning pins 51_1, 51_2 illustrated in FIG. 4, and the positioning pins 53_1, 53_2 illustrated in FIG. 5.

By virtue of the present disclosure according to the present embodiment described above, the core conveying device and the core conveying method capable of accurately conveying a core can be provided.

Embodiment 2

Figure 6:
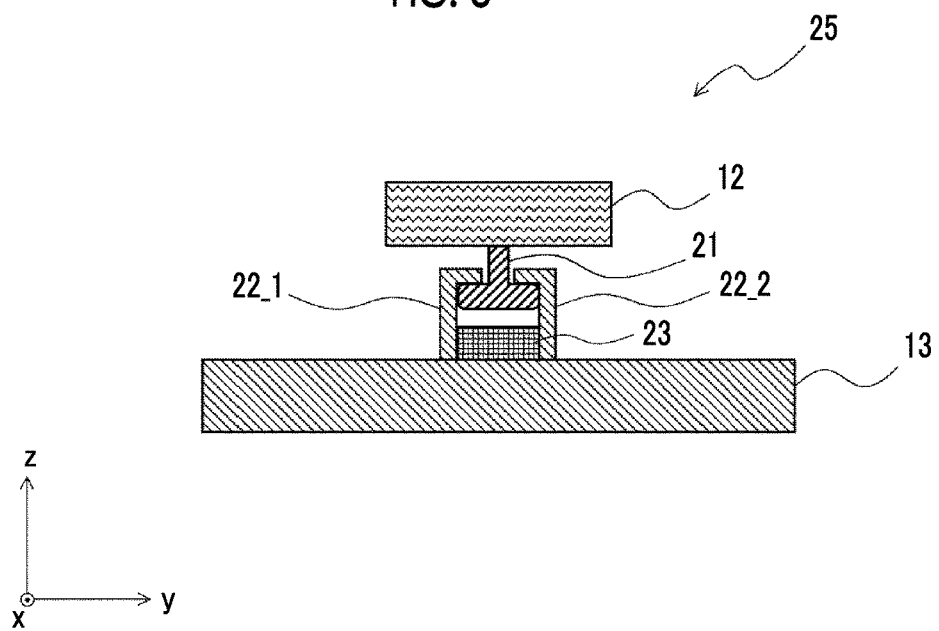
FIG. 6 is a sectional view for describing a sliding mechanism provided in a core conveying device according to Embodiment 2.

Next, Embodiment 2 of the present disclosure will be described. FIG. 6 is a sectional view for describing a sliding mechanism provided in a core conveying device according to Embodiment 2. The core conveying device according to Embodiment 2 is different from the core conveying device described in Embodiment 1 in that a sliding mechanism 25 includes a fixing device (electromagnet 23). Since the core conveying device according to Embodiment 2 is the same as the core conveying device described in Embodiment 1 except this difference, the same constituent elements will be designated by the same reference signs, and the duplicate description thereof will be omitted.

Also in the core conveying device 2 according to the present embodiment, the movable unit 12 and the support section 13 are coupled together via the sliding mechanism 25. That is, the support section 13 is configured to be capable of sliding in the horizontal direction, i.e., in the x-axial direction with respect to the movable unit 12.

As illustrated in FIG. 6, the rail 21 is formed on the lower surface of the movable unit 12. Additionally, the sliding parts 22_1, 22_2 are formed on the upper surface of the support section 13. For example, the movable unit 12, the support section 13, the rail 21, and the sliding parts 22_1, 22_2 are made using a metallic material.

As illustrated in FIG. 6, the sliding parts 22_1, 22_2 are provided on both sides of the rail 21 and are configured to be capable of sliding in the direction (x-axial direction) in which the rail 21 extends. Therefore, the support section 13 slides in the x-axial direction with respect to the movable unit 12. Additionally, the electromagnet 23 is provided between the sliding part 22_1 and the sliding part 22_2. Therefore, by bringing the electromagnet 23 into an ON state, the sliding parts 22_1, 22_2 made of a metallic material are magnetized, a magnetic force acts between the sliding parts 22_1, 22_2 and the rail 21 made of the metallic material, and the support section 13 is fixed to the movable unit 12. In this case, the electromagnet 23 functions as the fixing device. In addition, as illustrated in FIG. 6, when the electromagnet 23 is disposed, a gap is provided between the upper surface of the electromagnet 23 and the lower surface of the rail 21 such that the rail 21 and the electromagnet 23 are not attracted to each other by a magnetic force.

Since the core conveying device according to Embodiment 2 is the same as the core conveying device described in Embodiment 1 regarding the configuration excluding the above configuration, duplicate description will be omitted.

Next, the operation when the core conveying device according to the present embodiment conveys a core (core conveying method) will be described with reference to FIGS. 7A to 7K. In the following, the operation until the core 33 placed on the mounting table 31 is fitted in the mold 41 using the core conveying device 2 (refer to FIG. 7G to FIG. 7K) will be described.

Figure 7A:
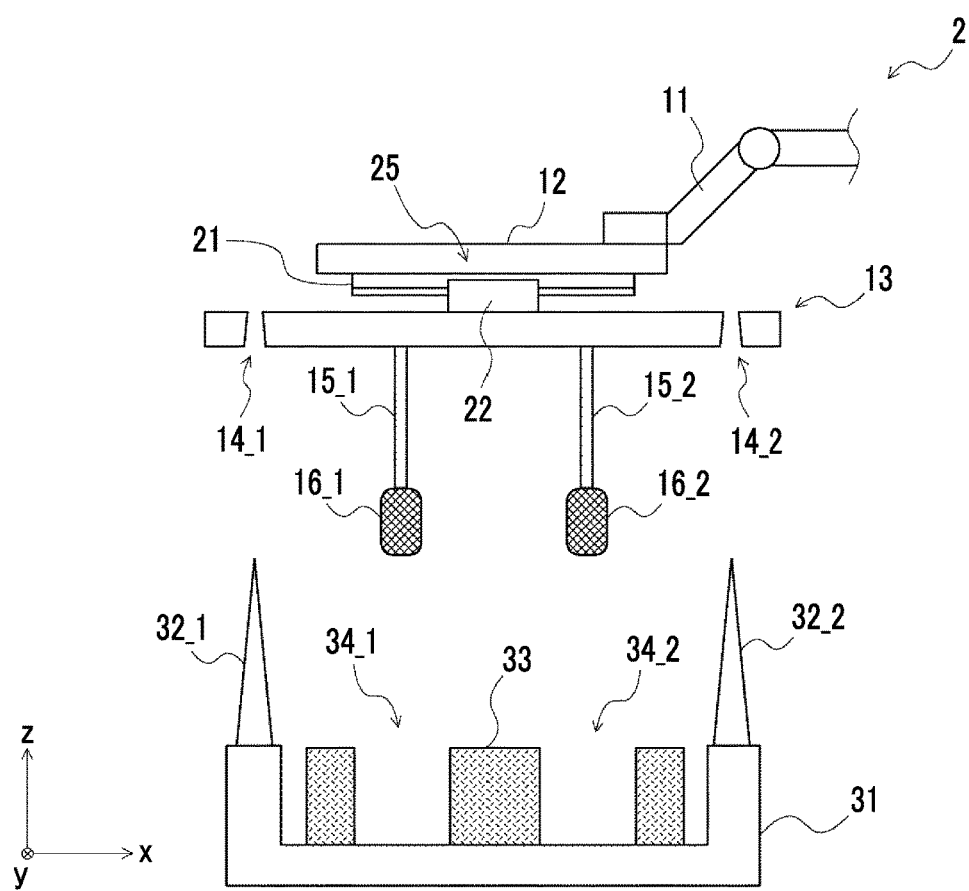
FIG. 7A is a view for describing an operation when the core conveying device according to Embodiment 2 conveys a core.

First, as illustrated in FIG. 7A, the core conveying device 2 is moved to a position where the core 33 is placed. Specifically, the holding devices 15_1, 15_2 (gripping parts 16_1, 16_2) are disposed on the core 33 by adjusting the coordinates of the movable unit 12 on the xy plane using the robot arm 11.

Figure 7B:
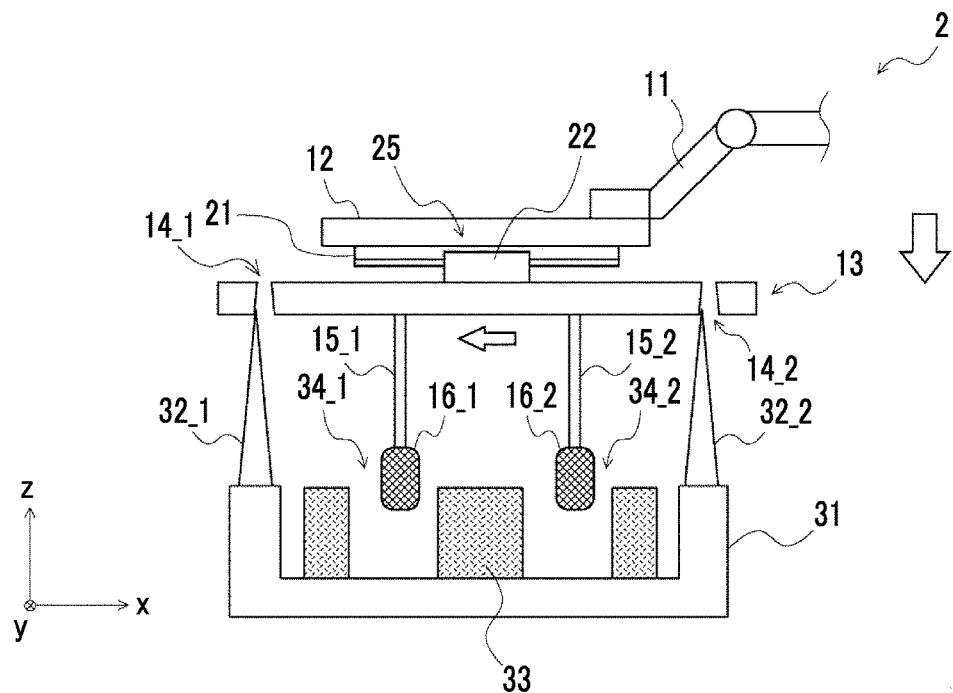
FIG. 7B is a view for describing the operation when the core conveying device according to Embodiment 2 conveys the core.
Figure 7C:
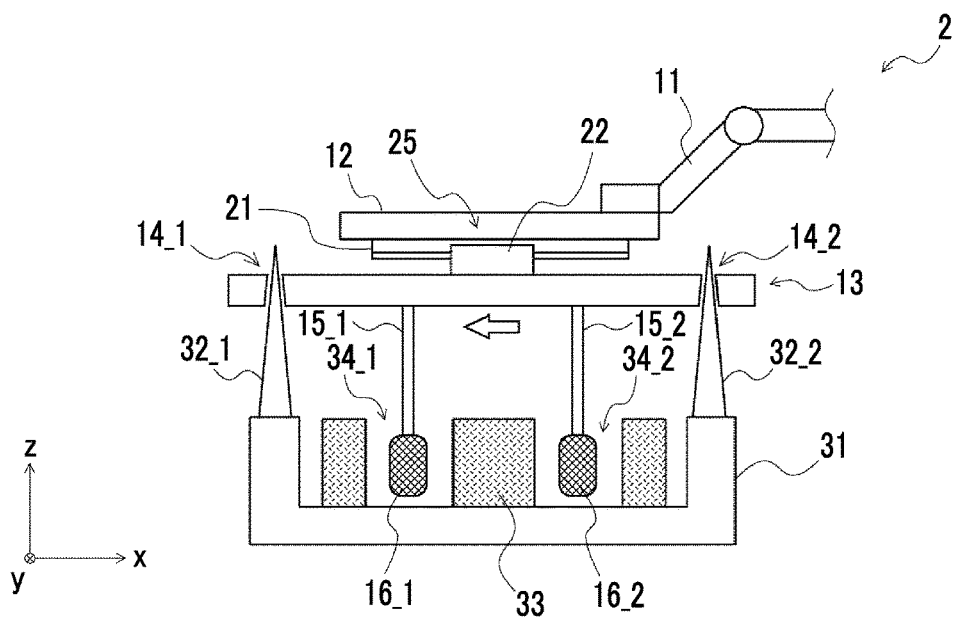
FIG. 7C is a view for describing the operation when the core conveying device according to Embodiment 2 conveys the core.

Next, the movable unit 12 of the core conveying device 2 is moved in the downward direction (z-axis minus direction) using the robot arm 11. Accordingly, the support section 13 moves downward. In this case, as illustrated in FIG. 7B, the tips of the positioning pins 32_1, 32_2 provided on the mounting table 31 abut against the inner surfaces of the holes 14_1, 14_2 of the support section 13. Accordingly, a force in the x-axis minus direction acts on the support section 13.

Then, when the movable unit 12 is further moved in the downward direction using the robot arm 11, the support section 13 further moves downward. Through the operation as described above, as illustrated in FIG. 7C, the positioning pins 32_1, 32_2 abut against the inner surfaces of the holes 14_1, 14_2, and the support section 13 slides in the horizontal direction (x-axial direction) with respect to the movable unit 12, and thereby, the position of the support section 13 in the horizontal direction (x-axial direction) with respect to the core 33 is determined. Additionally, the holding devices 15_1, 15_2 move downward, and the gripping parts 16_1, 16_2 of the holding devices 15_1, 15_2 are respectively inserted into the grip holes 34_1, 34_2 formed in the core 33.

Figure 7D:
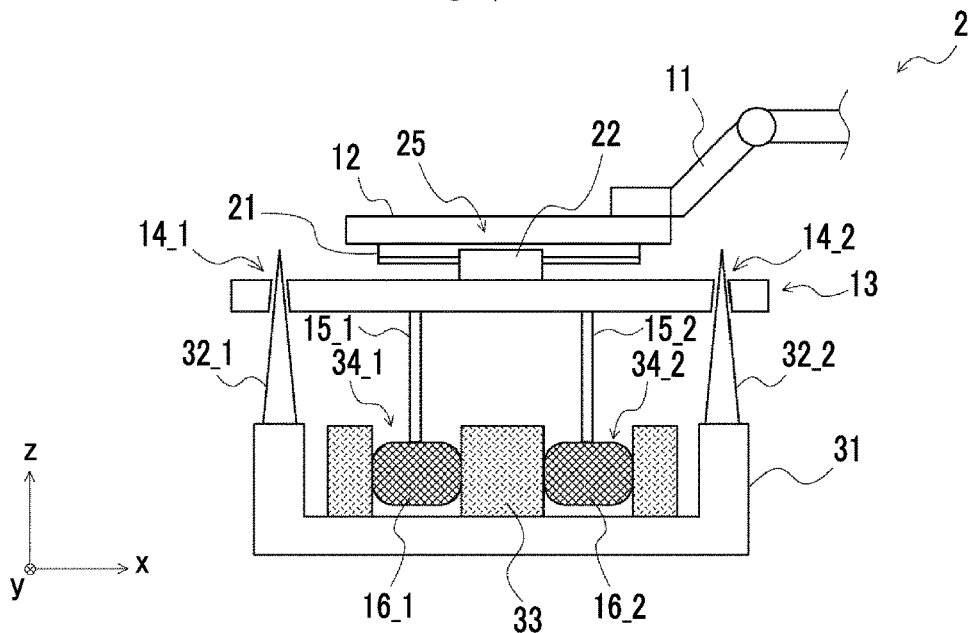
FIG. 7D is a view for describing the operation when the core conveying device according to Embodiment 2 conveys the core.

Next, as illustrated in FIG. 7D, the gripping parts 16_1, 16_2 inserted into the grip holes 34_1, 34_2 formed in the core 33 are expanded. Accordingly, the gripping parts 16_1, 16_2 abut against the inner walls (side walls) of the grip holes 34_1, 34_2 formed in the core 33, and the holding devices 15_1, 15_2 are fixed to the core 33.

Figure 7E:
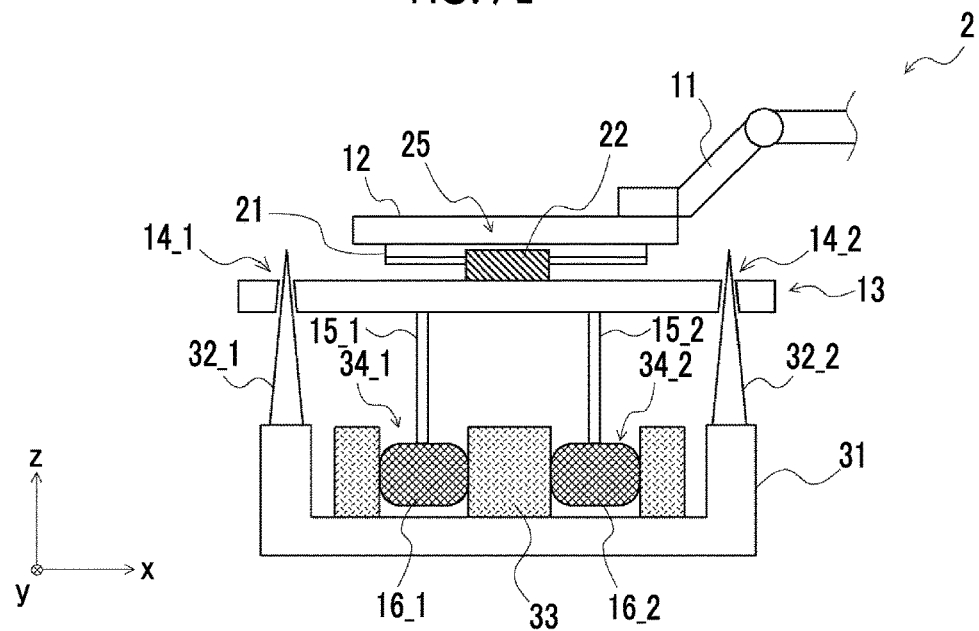
FIG. 7E is a view for describing the operation when the core conveying device according to Embodiment 2 conveys the core.

Next, as illustrated in FIG. 7E, the support section 13 is fixed to the movable unit 12. Specifically, the electromagnet 23 provided in the sliding mechanism 25 illustrated in FIG. 6 is brought into an ON state. Therefore, the sliding parts 22_1, 22_2 made of a metallic material are magnetized, a magnetic force acts between the sliding parts 22_1, 22_2 and the rail 21 made of the metallic material, and the support section 13 is fixed to the movable unit 12. In addition, in FIG. 7E, a state where the sliding part 22 is magnetized is illustrated by hatching.

Figure 7F:
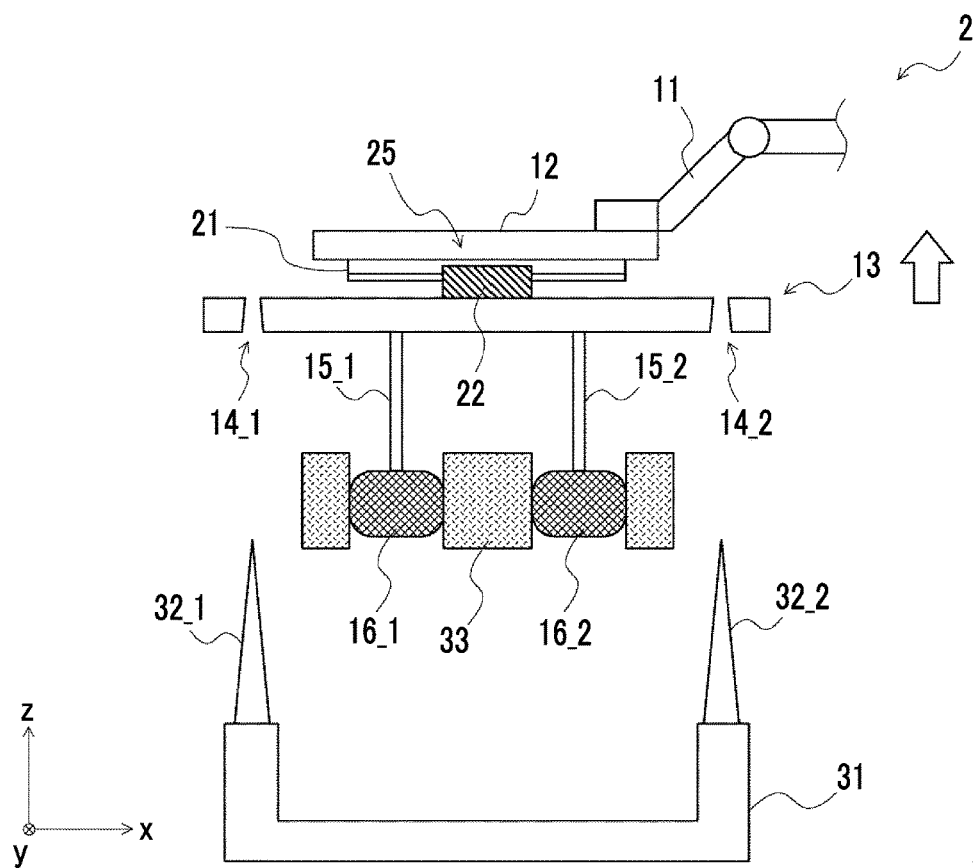
FIG. 7F is a view for describing the operation when the core conveying device according to Embodiment 2 conveys the core.

Thereafter, as illustrated in FIG. 7F, the movable unit 12 of the core conveying device 2 is moved upward (z-axis plus direction) using the robot arm 11. Accordingly, the holding devices 15_1, 15_2 move upward, and the core 33 is lifted. In this case, since the support section 13 is fixed to the movable unit 12, the core 33 can be stably lifted.

Figure 7G:
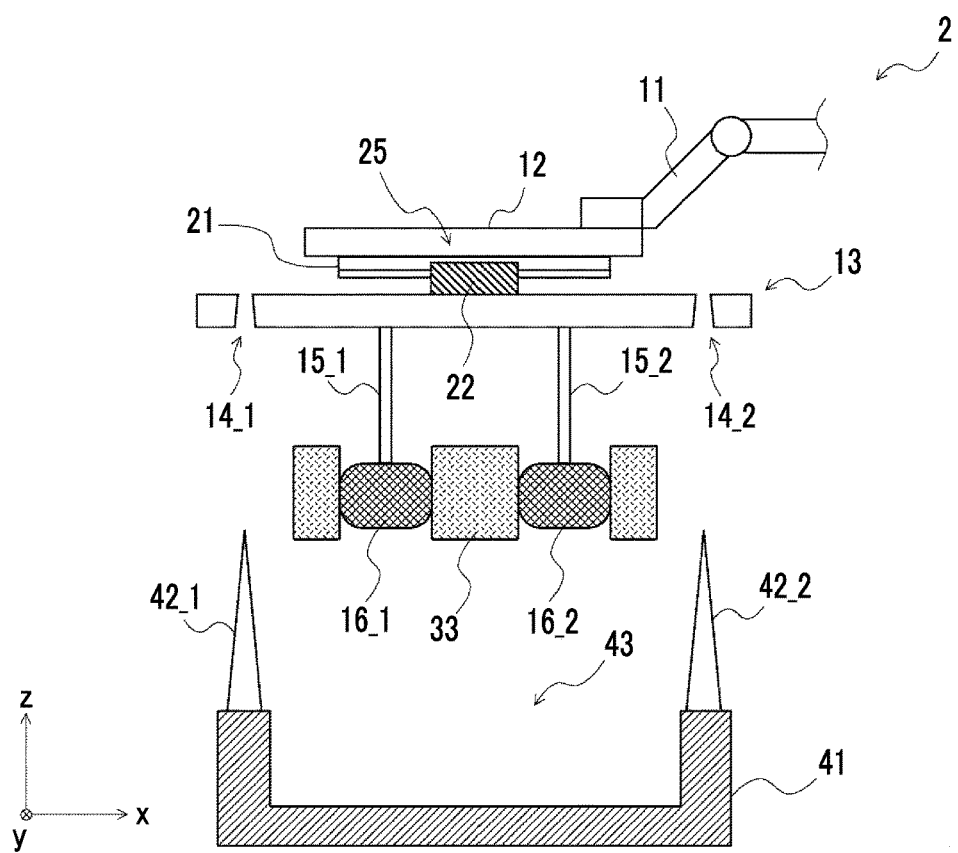
FIG. 7G is a view for describing the operation when the core conveying device according to Embodiment 2 conveys the core.

Thereafter, as illustrated in FIG. 7G, the core conveying device 2 is moved to a position where the mold 41 is placed in a state where the core conveying device 2 grips the core 33. Specifically, the core 33 is disposed on the recess 43 of the mold 41 by adjusting the coordinates of the movable unit 12 on the xy plane using the robot arm 11.

Figure 7H:
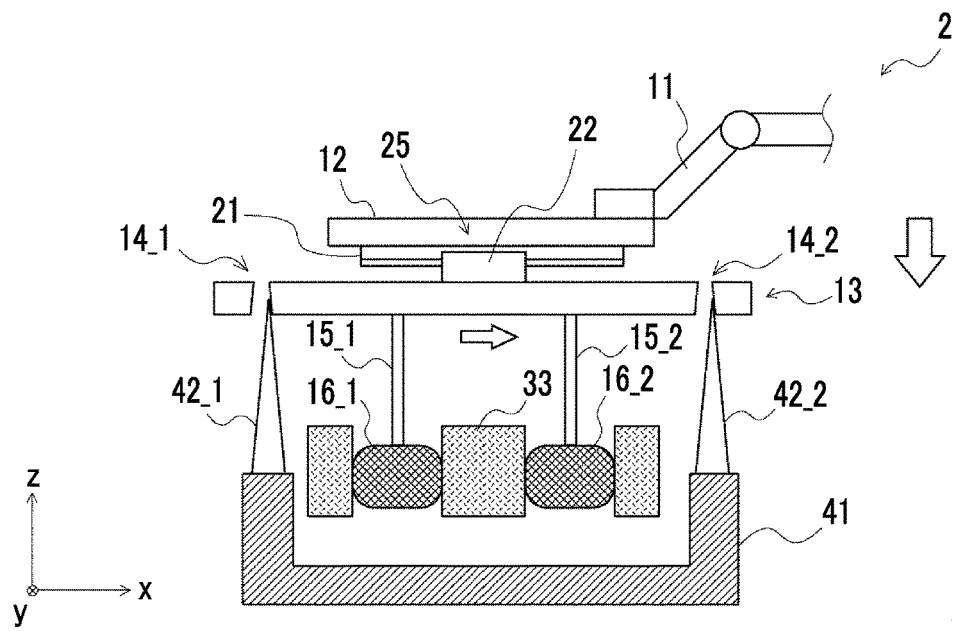
FIG. 7H is a view for describing the operation when the core conveying device according to Embodiment 2 conveys the core.

Next, the movable unit 12 of the core conveying device 2 is moved in the downward direction (z-axis minus direction) using the robot arm 11. Accordingly, the support section 13 moves downward. In this case, as illustrated in FIG. 7H, the tips of the mold positioning pins 42_1, 42_2 provided on the mold 41 abut against the inner surfaces of the holes 14_1, 14_2 of the support section 13. Accordingly, a force in the x-axis plus direction acts on the support section 13. Additionally, the electromagnet 23 illustrated in FIG. 6 is brought into an OFF state at this timing. Accordingly, the support section 13 is brought into a state where the supporting section is capable of sliding with respect to the movable unit 12.

Figure 7I:
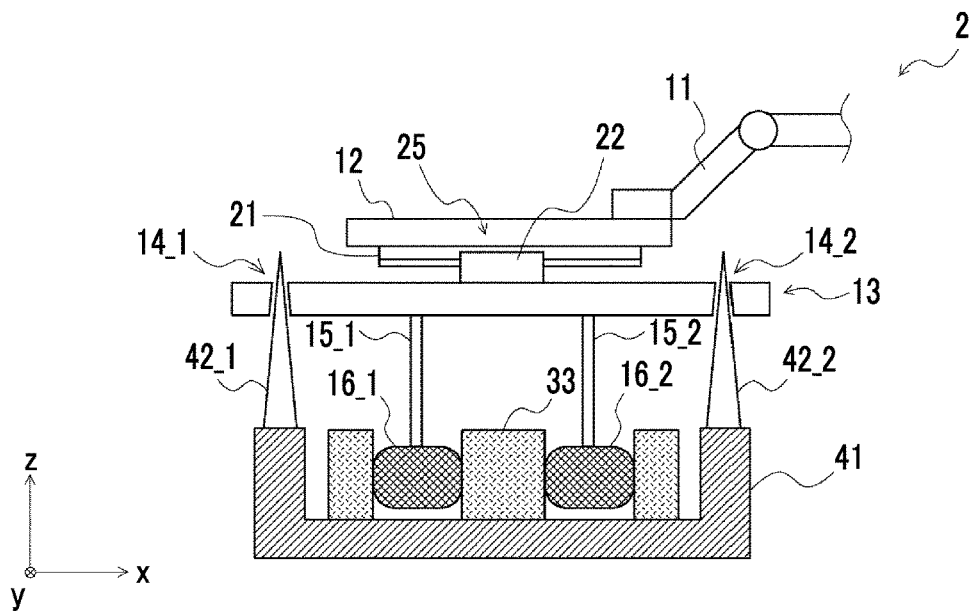
FIG. 7I is a view for describing the operation when the core conveying device according to Embodiment 2 conveys the core.

Then, when the movable unit 12 is further moved in the downward direction using the robot arm 11, the support section 13 further moves downward, and the core 33 is fitted in the mold 41 as illustrated in FIG. 7I. In this case, as the mold positioning pin 42_1, 42_2 formed on the mold 41 abut against the inner surface of the holes 14_1, 14_2 of the support section 13 and the support section 13 slides in the x-axial direction with respect to the movable unit 12, the position of the support section 13 in the x-axial direction with respect to the mold 41 (that is, the position of the core 33 in the x-axial direction with respect to the mold 41) is determined. Therefore, the core 33 can be accurately fitted in the mold 41.

Figure 7J:
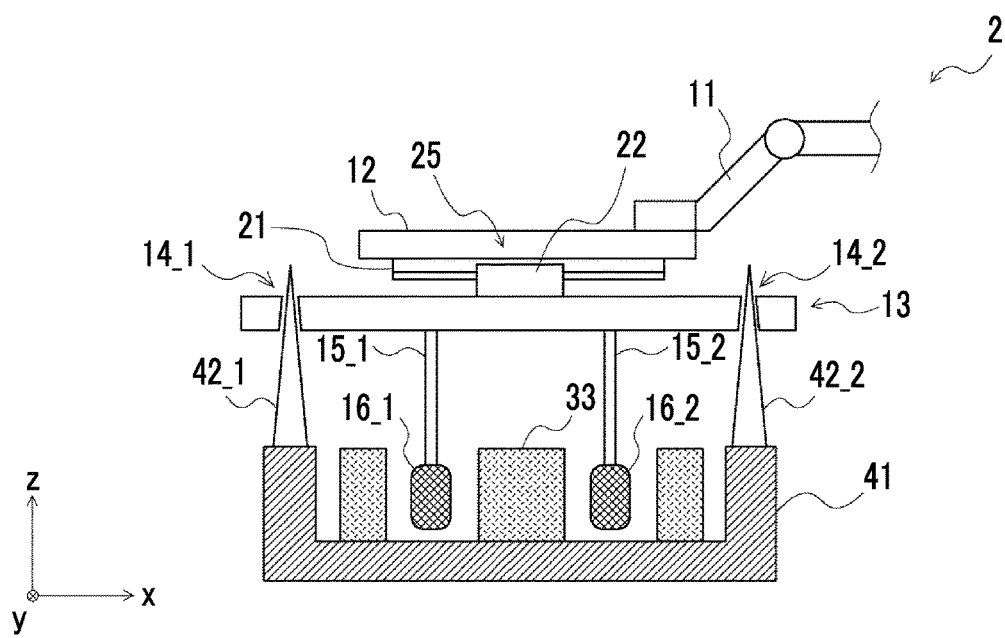
FIG. 7J is a view for describing the operation when the core conveying device according to Embodiment 2 conveys the core.
Figure 7K:
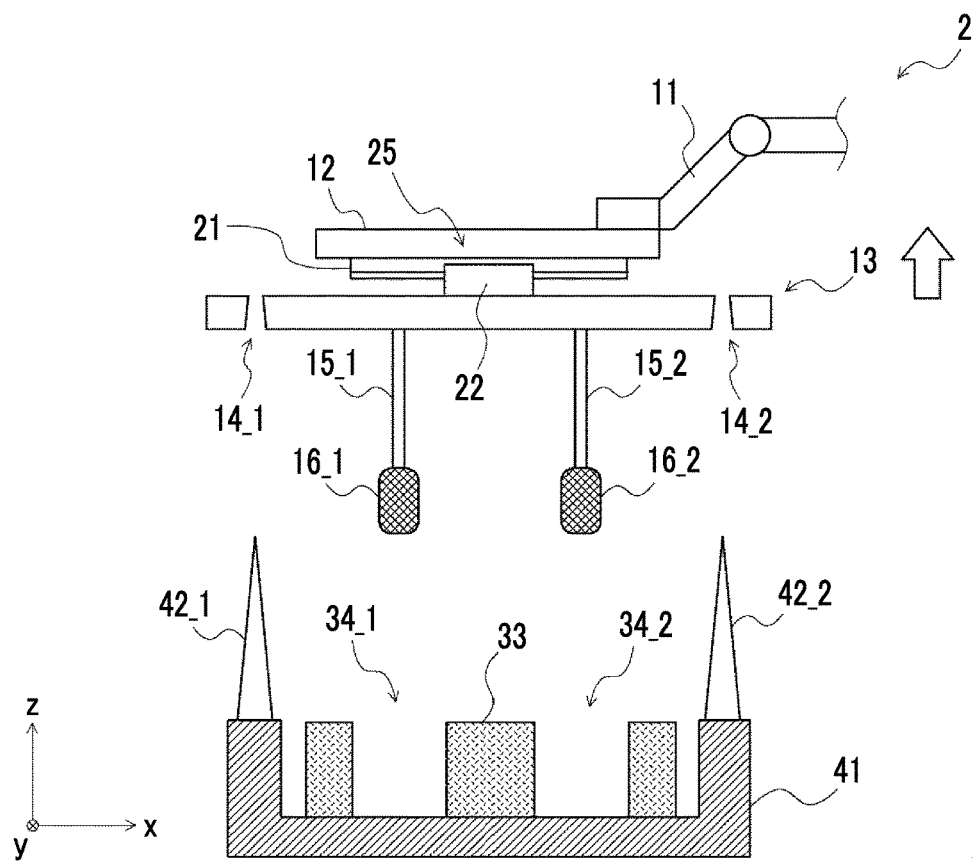
FIG. 7K is a view for describing the operation when the core conveying device according to Embodiment 2 conveys the core.

Thereafter, as illustrated in FIG. 7J, the gripping parts 16_1, 16_2 are contracted. Accordingly, the gripping parts 16_1, 16_2 are brought into a state where the gripping parts do not grip the core 33. Then, as illustrated in FIG. 7K, the movable unit 12 of the core conveying device 2 is moved upward (z-axis plus direction) using the robot arm 11.

By virtue of the present disclosure according to the present embodiment described above, the core conveying device and the core conveying method capable of accurately conveying a core can be provided.

Particularly, in the core conveying device 2 according to the present embodiment, as illustrated in FIG. 6, the sliding mechanism 25 is provided with the fixing device (electromagnet 23). Also, after the position of the support section 13 in the horizontal direction with respect to the core 33 is determined and the gripping parts 16_1, 16_2 are expanded to grip the core 33 (refer to FIG. 7D), the support section 13 is fixed to the movable unit 12 using the fixing device (electromagnet 23) (refer to FIG. 7E). Also, the core 33 is conveyed from the mounting table 31 to the mold 41 in a state where the support section 13 is fixed to the movable unit 12 using the fixing device (electromagnet 23) (refer to FIG. 7E to FIG. 7H).

In the core conveying device according to the present embodiment as described above, the support section 13 is fixed to the movable unit 12 using the fixing device (electromagnet 23). Then, when the core 33 is conveyed from the mounting table 31 to the mold 41, the core 33 can be stably conveyed.

Embodiment 3

Figure 8A:
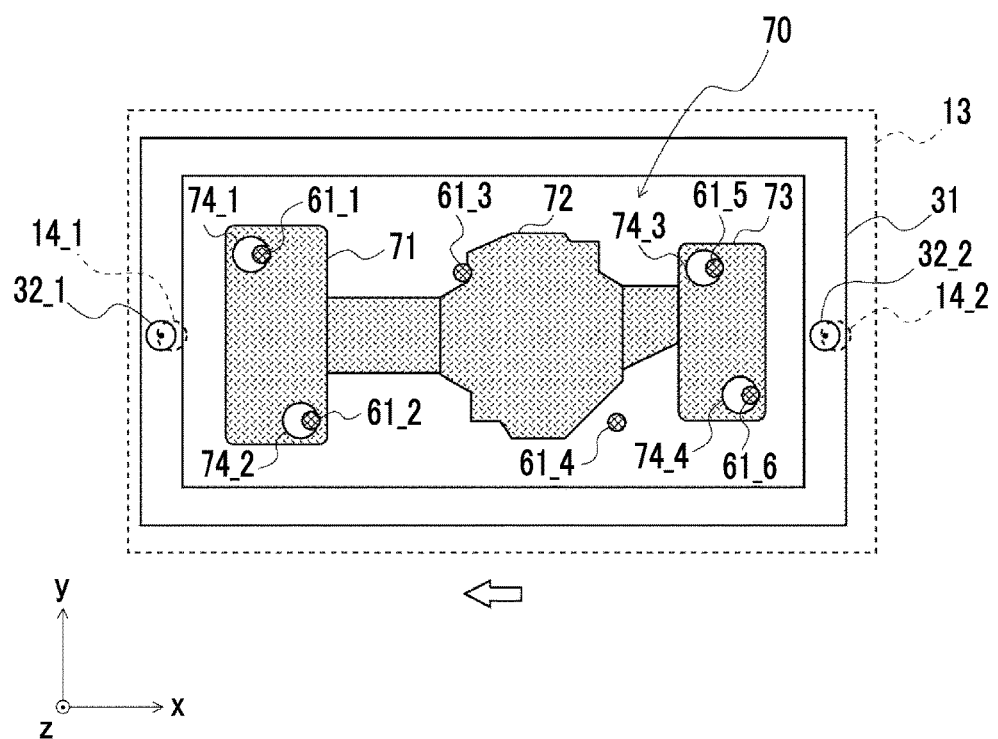
FIG. 8A is a plan view for describing an operation when a core conveying device according to Embodiment 3 conveys a core.
Figure 8B:
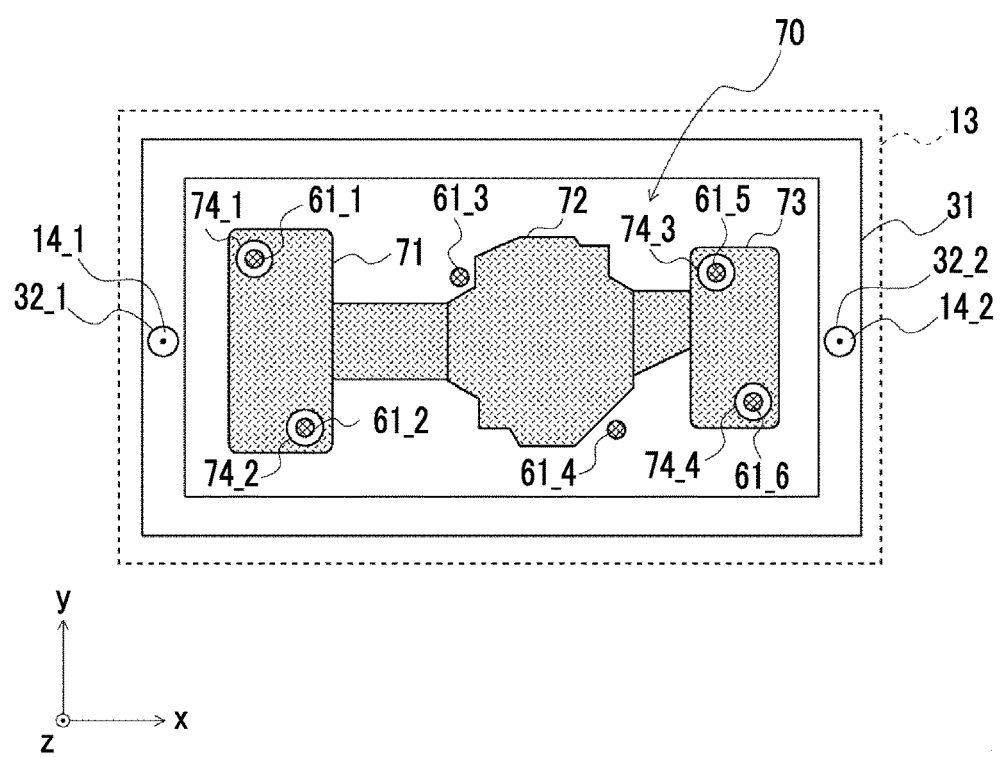
FIG. 8B is a plan view for describing an operation when a core conveying device according to Embodiment 3 conveys the core.
Figure 8C:
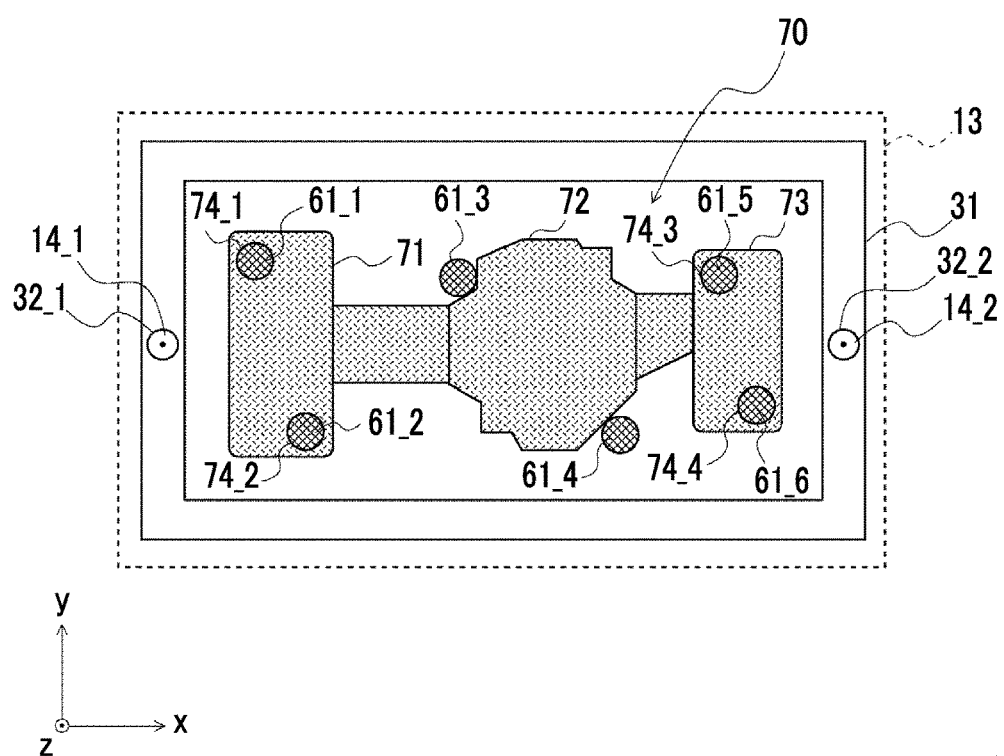
FIG. 8C is a plan view for describing the operation when the core conveying device according to Embodiment 3 conveys the core.

Next, Embodiment 3 of the present disclosure will be described. FIGS. 8A to 8C are plan views for describing an operation when a core conveying device according to Embodiment 3 conveys a core. In the present embodiment, as illustrated in FIGS. 8A to 8C, an operation in a case where a core 70 including first to third portions 71 to 73 is gripped will be described. In addition, since the core conveying device to be described in the present embodiment is the same as the core conveying device described in Embodiments 1 and 2, duplicate description will be omitted.

Additionally, in FIGS. 8A to 8C, so as to simplify the drawings, solely the support section 13, the holes 14_1, 14_2, and gripping parts 61_1 to 61_6 of the core conveying device are illustrated, and illustration of the other constituent elements is omitted. Additionally, the support section 13 and the holes 14_1, 14_2 are illustrated by dashed lines.

As illustrated in FIGS. 8A to 8C, the core 70 includes the first to third portions 71 to 73. The core 70 is placed on the mounting table 31. The positioning pins 32_1, 32_2 are provided at sides of the mounting table 31 on both sides in the x-axial direction. In an example illustrated in FIGS. 8A to 8C, the core 70 is gripped using six gripping parts 61_1 to 61_6. Specifically, the gripping parts 61_1, 61_2 are expanded in the grip holes 74_1, 74_2 formed in the first portion 71 of the core 70, thereby gripping the first portion 71 of the core 70. The gripping parts 61_3, 61_4 are expanded at a side surface of the second portion 72 of the core 70 and abut against the side surface of the second portion 72 of the core 70, thereby gripping the second portion 72 of the core 70. The gripping parts 61_5, 61_6 are expanded in the grip holes 74_3, 74_4 formed in the third portion 73 of the core 70, thereby gripping the third portion 73 of the core 70.

When the core 70 is gripped, as illustrated in FIG. 8A, the support section 13 is disposed on the core 70. In this case, the position of the gripping parts 61_1 to 61_6 disposed on the core 70 deviates from a grip position (that is, an original grip position) for gripping the core 70.

Next, the support section 13 of the core conveying device is moved in the downward direction (z-axis minus direction). In this case, the positioning pins 32_1, 32_2 provided on the mounting table 31 abut against the inner surfaces of the holes 14_1, 14_2 of the support section 13, and thereby, a force in the x-axis minus direction acts on the support section 13. Accordingly, the support section 13 slides in the x-axis minus direction, and as illustrated in FIG. 8B, the position of the support section 13 in the x-axial direction with respect to the core 70 is determined. Therefore, the gripping parts 61_1 to 61_6 are disposed at the grip position of the core 70. Then, as illustrated in FIG. 8C, the core 70 can be gripped by expanding the gripping parts 61_1 to 61_6.

By virtue of the present disclosure according to the present embodiment described above, the core conveying device and the core conveying method capable of accurately conveying a core can be provided.

In addition, a configuration in which a core is gripped by inserting the gripping parts 16_1, 16_2 into the grip holes 34_1, 34_2 to expand the gripping parts 16_1, 16_2 has been described in Embodiments 1 and 2 (refer to FIG. 1). However, also in Embodiments 1 and 2, the gripping parts 61_3, 61_4 may be made to abut against side surfaces of a core to grip the core as in the present embodiment (refer to FIG. 8C).

Additionally, a configuration in which the support section 13 slides in the x-axial direction (that is, a single-axial direction) with respect to the movable unit 12 has been described in the core conveying device described in Embodiments 1 to 3. However, the core conveying device may be configured such that the support section 13 slides in the x-axial direction and the y-axial direction (that is, biaxial directions) with respect to the movable unit 12. In this case, for example, a sliding mechanism that slides in the y-axial direction is separately provided between the movable unit 12 and the support section 13.

Although the present disclosure has been described with reference to the above embodiments, an applicable embodiment of the present disclosure is not limited solely to the configurations of the embodiments. It goes without saying that the present disclosure can be applied by various alternations, modifications, and combinations that can be made by those skilled in the art within the scope of the present disclosure.

What is claimed is:

1. A core conveying device comprising:
a plurality of holding devices, each of the holding devices including a gripping part configured to be expanded and contracted by a fluid, the gripping part being configured to be expanded so as to grip a core;
a support section that supports the holding devices;
a moving device that is connected to the support section and is configured to move the support section; and
a mounting table that includes a positioning pin that extends in an upward direction and is configured to accommodate the core, wherein:
the support section has a hole formed at a position corresponding to the positioning pin and is connected so as to slide in a horizontal direction with respect to the moving device;
a size of a lower end opening of the hole is larger than a size of an upper end of the positioning pin; and
the support section is configured such that, when the support section is moved downward so as to grip the core, as the positioning pin abuts against an inner surface of the hole and the support section slides in the horizontal direction with respect to the moving device, a position of the support section in the horizontal direction with respect to the core is determined.

2. The core conveying device according to claim 1, wherein:
a shape of the positioning pin is a cone shape that tapers in an upward direction; and
the inner surface of the hole is a tapered shape of which a diameter becomes gradually smaller in the upward direction.

3. The core conveying device according to claim 1, further comprising a fixing device that fixes the support section to the moving device.

4. A core conveying method for a core conveying device, the core conveying device including a plurality of holding devices, a support section, a moving device, and a mounting table, each of the holding devices including a gripping part configured to be expanded and contracted by a fluid, the support section supporting the holding devices, the moving device being connected to the support section and being configured to move the support section, the mounting table being configured to accommodate the core, the mounting table including a positioning pin that extends in an upward direction, the support section having a hole formed at a position corresponding to the positioning pin, the support section being connected so as to slide in a horizontal direction with respect to the moving device, and a size of a lower end opening of the hole being larger than a size of an upper end of the positioning pin, the core conveying method comprising:
moving the support section downward to make the positioning pin abut against an inner surface of the hole when the core is gripped by the gripping part; and
sliding the support section in the horizontal direction with respect to the moving device and determining a position of the support section in the horizontal direction with respect to the core when the positioning pin abuts against the inner surface of the hole.

5. The core conveying method according to claim 4, further comprising:
expanding the gripping parts to grip the core after the position of the support section in the horizontal direction with respect to the core is determined; and
fixing the support section to the moving device using a fixing device that fixes the support section to the moving device after the core is gripped.

6. The core conveying method according to claim 5, further comprising:
releasing a state where the support section is fixed to the moving device and making a mold positioning pin abut against the inner surface of the hole, when the gripped core is fitted in a mold, the mold positioning pin being provided on the mold and extending in an upward direction from the mold; and
sliding the support section in the horizontal direction with respect to the moving device and determining a position of the support section in the horizontal direction with respect to the mold, when the mold positioning pin abuts against the inner surface of the hole.

7. The core conveying method according to claim 4, wherein:
a shape of the positioning pin or a mold positioning pin is a cone shape that tapers in an upward direction; and
the inner surface of the hole is a tapered shape of which a diameter becomes gradually smaller in the upward direction.

* * * * *